United States Patent
Zimmer

(10) Patent No.: US 12,248,284 B2
(45) Date of Patent: *Mar. 11, 2025

(54) METHOD FOR TRAINING A MACHINE LEARNING ALGORITHM

(71) Applicant: Robert Bosch GmbH, Stuttgart (DE)

(72) Inventor: Christoph Zimmer, Korntal (DE)

(73) Assignee: Robert Bosch GmbH, Stuttgart (DE)

( * ) Notice: Subject to any disclaimer, the term of this patent is extended or adjusted under 35 U.S.C. 154(b) by 456 days.

This patent is subject to a terminal disclaimer.

(21) Appl. No.: 17/841,849

(22) Filed: Jun. 16, 2022

(65) Prior Publication Data

US 2022/0404781 A1    Dec. 22, 2022

(51) Int. Cl.
*G05B 13/02*    (2006.01)

(52) U.S. Cl.
CPC .................. *G05B 13/0265* (2013.01)

(58) Field of Classification Search
CPC ........ G05B 13/0265; G05B 1/00; G05B 9/00; G05B 11/00; G05B 19/00; G05B 15/00; G05B 2219/00; G05B 23/00; G05B 24/00; G05B 13/00
See application file for complete search history.

(56) References Cited

U.S. PATENT DOCUMENTS

| | | | |
|---|---|---|---|
| 2015/0186795 A1* | 7/2015 | Chandra | G06N 20/20 706/12 |
| 2017/0153642 A1* | 6/2017 | Scheepjens | G06N 20/10 |
| 2019/0272479 A1* | 9/2019 | Mars | G06F 18/217 |
| 2019/0340533 A1* | 11/2019 | Copper | G06N 3/084 |

FOREIGN PATENT DOCUMENTS

| | | | |
|---|---|---|---|
| DE | 102016216941 A1 | * | 3/2017 |
| DE | 10 2016 216 945 A1 | | 3/2018 |

OTHER PUBLICATIONS

Xie, Jiyang et al. "Channel Attention with Embedding Gaussian Process: A Probabilistic Methodology" School of Electrical and Data Engineering, University of Technology Sydney, Sydney, Australia. 8 Pages.

Kabzan, Juraj et al. "Learning-based Model Predictive Control for Autonomous Racing" IEEE Robotics and Automation Letters, vol. 4, No. 4, Oct. 2019. 8 Pages.

Chen, Changhao et al. "Selective Sensor Fusion for Neural Visual-Inertial Odometry" 10 Pages.

* cited by examiner

*Primary Examiner* — Kidest Bahta
(74) *Attorney, Agent, or Firm* — Norton Rose Fulbright US LLP

(57) ABSTRACT

A method for training a machine learning algorithm including uncertainties. The method includes: pre-training the algorithm based on initially collected data by a control unit in order to obtain an initial model, determining a set of channels, the data originating from channels contained in the set of channels being intended to be used for retraining the initial model, based on an established data level and on the respective influence, which the data originating from one of the channels have on uncertainties instantaneously contained in the initial model, transferring detected data originating from the individual channels of the set of channels to the control unit, and retraining of the initial model by the control unit based on the data transferred to the control unit.

14 Claims, 2 Drawing Sheets

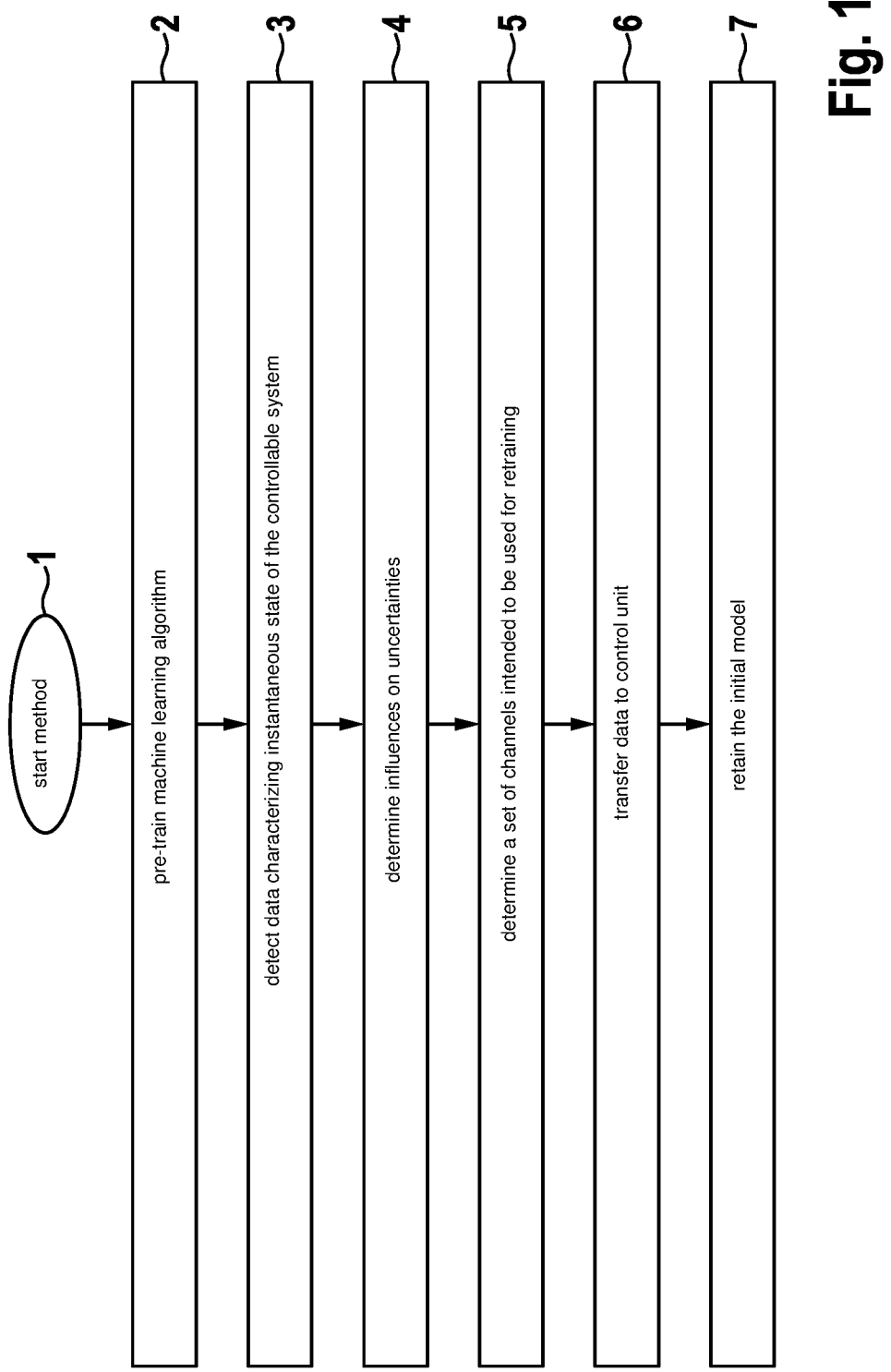

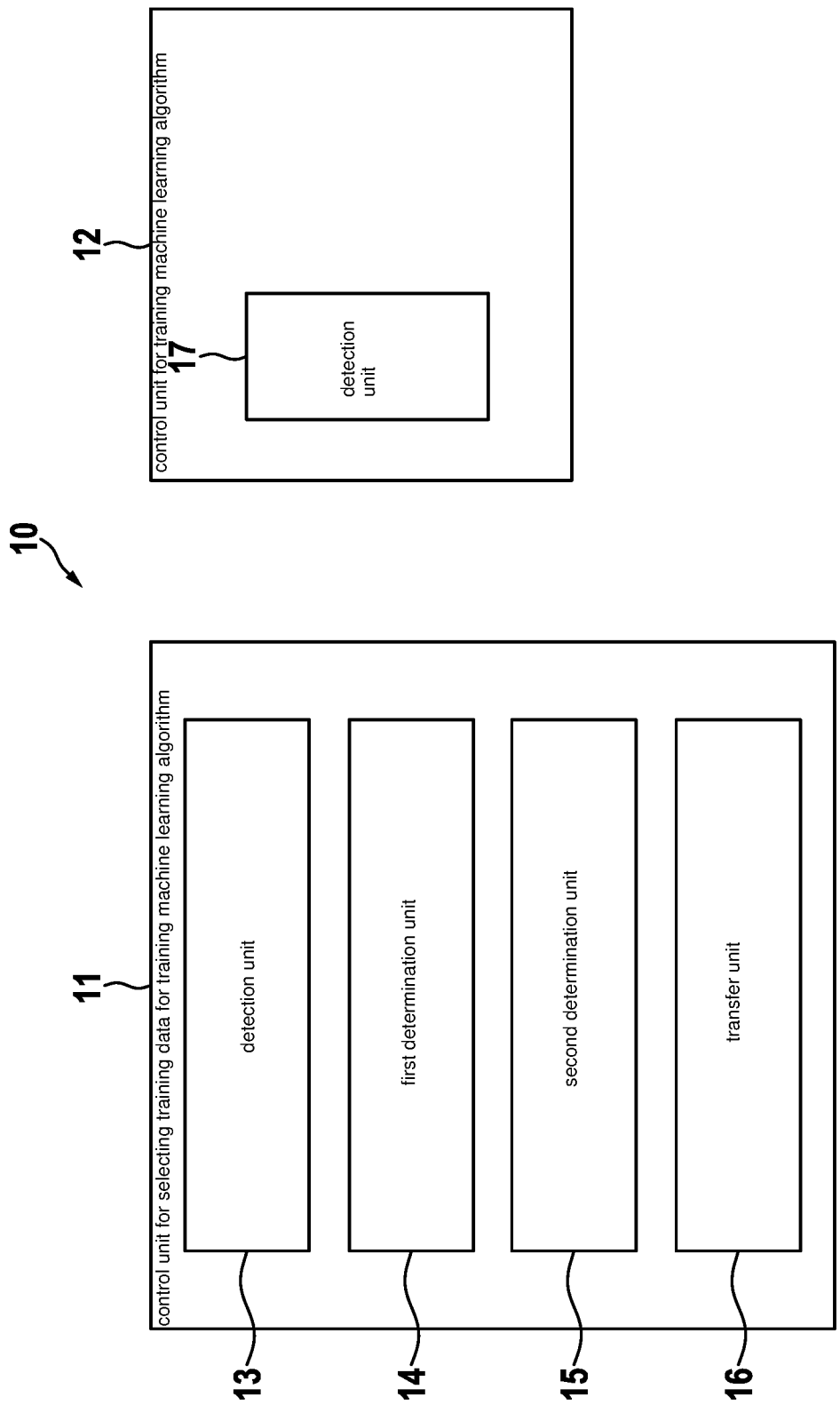

METHOD FOR TRAINING A MACHINE LEARNING ALGORITHM

FIELD

The present invention relates to a method for training a machine learning algorithm for controlling at least one controllable system, the at least one controllable system being trained based on a machine learning algorithm including uncertainties, the machine learning algorithm being capable of being retrained during an operation of the at least one controllable system, and a transfer of training data to a control unit for retraining the machine learning algorithm being optimized.

BACKGROUND INFORMATION

Digital control units are used in numerous applications for controlling and regulating technical systems, which are referred to below in general as controllable systems. The control units in this case process sensor signals or other input values according to a predefined control algorithm, so that one or multiple output values is/are ascertained for functions, for example, actuating variables for the activation of positioning elements.

The control algorithm may, for example, be a machine learning algorithm. In this case, individual controllable systems each collect data about their use, these data subsequently being used to train the machine learning algorithm accordingly. In general, such machine learning algorithms are based on the fact that statistical methods are used in order to train a data processing system in such a way that the latter is able to carry out a particular task without it having been originally programed explicitly for this purpose. The aim of machine learning in this case is to construct algorithms, which are able to learn from data and to make predictions. These algorithms create mathematical models, with which, for example, data may be classified.

In this case, methods are available in which the algorithm is first pre-trained on initially collected data in order to obtain an initial model, which includes uncertainties. This has the advantage that the machine learning algorithm in this case may already be relatively quickly used for controlling the at least one controllable system, without initially all possible assignments, in particular, even rarely occurring assignments, having to be laboriously exactly trained. In this way, it is further possible to save computing time as well as corresponding computer capacities when training the machine learning algorithm. During the operation of the at least one controllable system, the machine learning algorithm or the initial model may then be retrained based on corresponding data detected during the operation of the at least one controllable system in order to eliminate uncertainties.

In this connection, however, it is shown to be problematical that controllable systems increasingly include a plurality of functions and/or corresponding actuators to be controlled. If during the operation of the controllable system data relating to all of these functions to be controlled were now detected and thus a plurality of data or a large volume of data were to be transferred to a corresponding control unit for retraining the machine learning algorithm, this may, however, result in problems during the data transfer, for example, in latencies or interaction effects such as interferences.

A method for carrying out a function based on a model value of a data-based function model is described in German Patent Application No. DE 10 2016 216 945 A1, where a model value of a data-based function model is ascertained at a query point, a model accuracy indication or a model validity indication, which indicates the accuracy or the validity of the model value of the data-based function model at the query point, and the function is carried out as a function of the model accuracy indication or model validity indication.

SUMMARY

An object of the present invention is to specify an optimized method for training a machine learning algorithm and, in particular, an optimized method for retraining a machine learning algorithm including uncertainties.

This object may be achieved with a method for training a machine learning algorithm according to the features of the present invention.

The object may further be achieved with a control unit including the features of the present invention.

The object may further be achieved by a system for training a machine learning algorithm according to the present invention.

Advantageous specific embodiments and refinements result from the description herein with reference to the figures.

According to one specific embodiment of the present invention, the object is achieved by a method for training a machine learning algorithm, the machine learning algorithm being an algorithm for controlling at least one controllable system, the machine learning algorithm assigning possible output values to input values, the machine learning algorithm including for each assignment of an input value to an output value an uncertainty, the uncertainty indicating in each case how well the assignment of the input value to the possible output value has been previously trained. The method in this case includes a pre-training of the machine learning algorithm based on data initially collected by a control unit for training the machine learning algorithm, in order to obtain an initial model. This control unit may be a central server, which is installed distally from the controllable system. Furthermore, data characterizing an instantaneous state of the at least one controllable system are detected during an operation of the at least one controllable system, the detected data originating from a first number of channels, for each channel of the first number of channels, an influence, which the data originating from the corresponding channel have on uncertainties instantaneously contained in the initial model, is determined in each case, and a set of channels is determined from the first number of channels, the data originating from channels included in the set of channels being intended to be used for retraining the initial model based on an established data level and on the respective influence, which the data originating from one of the channels of the first number of channels have on uncertainties instantaneously contained in the initial model, the detected data originating from the individual channels of the set of channels being transferred to the control unit, and the initial model being retrained by the control unit based on the data transferred to the control unit.

Uncertainty is understood hereby to mean a value or a variable, which indicates the quality of the assignment between the input value and the corresponding output value, i.e., on how much information content this assignment is based or how many training data have previously been received close to the assignment.

Initially collected data are understood to mean further data or training data, which are initially available for training the machine learning algorithm, it being, in particular, data that describe frequent or regularly occurring situations. The machine learning algorithm trained on these initially collected data is referred to in this case as an initial model.

Channels are understood to mean further elements, for example, sensors, which detect data during the operation of the at least one controllable system, which characterize the corresponding output values or settings of individual controllable functions or controllable actuators of the at least one controllable system, the individual controllable systems or controllable actuators being capable of being controlled or set during the operation of the at least one controllable system, in particular, also independently of the other controllable functions or controllable actuators of the at least one controllable system. For example, an autonomously driving vehicle may include functions for controlling a speed, a gear selection, and a temperature regulation based on an instantaneous situation, the data characterizing the settings of the speed and/or the gear selection and/or a temperature regulation correspondingly made during an operation of the autonomously driving motor vehicle being detected.

Influence, which the data originating from one of the channels from the first number of channels have on the uncertainties instantaneously contained in the initial model, is further understood to mean an information content of the data originating from the corresponding channel, the information content indicating to what extent these data are relevant for the retraining of the initial model, i.e., whether or to what extent uncertainties in the initial model may be reduced by a retraining of the initial model based on these data. Instantaneously contained uncertainties in this case refer to uncertainties contained in the potentially already retrained initial model at a particular point in time.

Furthermore, the established data level refers to a defined level of pieces of information in the data transferred to the control unit, for example, a maximum volume of data to be transferred or how high the information content in the transferred data overall should at least be. The established data level in this case may be predefined, for example, by a model manufacturer or by a manufacturer of the at least one controllable system or by an operator of the control unit or of a corresponding data center.

Thus, on the whole, not all detected data are transferred to the (in particular, distal) control unit for retraining the machine learning algorithm, but only the data of selected channels.

In this way, it is possible to prevent problems during the data transfer, for example, latencies or interaction effects such as interferences. The data transfer may further be designed in such a way that conditions of a corresponding data transfer system (in particular, of a bus system), for example, capacities of a CAN bus or available bandwidths of a wireless data transfer are taken into consideration. In addition, the method ensures a dynamic refining or active learning of the algorithm where, based on the selected transferred data, very rare situations even in practice may be trained. As a result, the accuracy in the assigning of input values to output values may further be increased by the machine learning algorithm. Thus, on the whole, an optimized method for training a machine learning algorithm and, in particular, an optimized method for retraining a machine learning algorithm including uncertainties are specified.

The at least controllable system in this case may, for example, be driver assistance functions of an autonomously driving vehicle, which include functions relating to the autonomously driving motor vehicle, for example, gear selection, speed selection or temperature setting. The at least one controllable system may further, however, also be, for example, any further controllable system based on a machine learning algorithm, for example, a kitchen appliance or a washing machine.

The input value may further be a sensor signal, for example. The input value may, however, further also be predefined by a user, for example. An output value characterizes a corresponding activation signal for controlling the at least one controllable system, or a value at which the at least one controllable system is set.

In one specific embodiment of the present invention, the initial model in this case is a Gaussian process.

A Gaussian process is understood in this case to mean a stochastic process, in which each finite subset of random variables is normally distributed (Gaussian-distributed) in a multi-dimensional manner. Generally speaking, a Gaussian process represents temporal, spatial or arbitrary other functions, whose functional values are able to be modelled only with particular uncertainties and probabilities due to incomplete information.

Such a Gaussian process is therefore suitable for obtaining or training the initial model in a quick and simple manner.

The initial model may further, however, also be any other machine learning algorithm including uncertainties, for example, a Bayesian neural network.

The established data level in this case may indicate what percentage of all detected data is to be transferred to the control unit. For example, the established data level may indicate which capacities the corresponding data transfer means has or how large an available bandwidth is, so that the corresponding transfer may be regulated based on the conditions of the corresponding data transfer means itself.

The established data level may, however, further indicate how great the influence, which transferred data have on uncertainties instantaneously contained in the initial model on the whole should at least be. The established data level may, in particular, be established in such a way that uncertainties in the algorithm of the machine learning algorithm or in the initial model are preferably quickly reduced in a data-efficient manner, as a result of which computing time and corresponding resources required during the refining or retraining of the initial model may be reduced.

In this case, the step of determining a set of channels from the first number of channels, the data originating from channels contained in the set of channels being intended to be used for retraining the initial model, may include in each case a selection of channels that are to be part of the set of channels, in such a way that the number of channels that are part of the set of channels is minimized and, at the same time, the data originating from these channels have a maximum possible influence on the uncertainties instantaneously contained in the initial model. Thus, a limited optimization method may be used for determining the corresponding channels. The limited optimization task may, however, also be to minimize the size of the total data to be transferred, with the limitation that the transferred data originating from corresponding channels at the same time have a maximum possible influence on the uncertainties instantaneously contained in the initial model.

With one further specific embodiment of the present invention, a method for controlling at least one controllable system is also specified, the method including a training of a machine learning algorithm for controlling the at least one controllable system by a method described above and a controlling of the at least one controllable system based on the trained machine learning algorithm.

Thus, on the whole, an optimized method for controlling at least one controllable system is specified, the at least one controllable system being controlled based on a machine learning algorithm, which has been trained based on an optimized method. Because an initial model is initially trained, the machine learning algorithm may thus be used already relatively quickly for controlling the at least one controllable system without initially all possible assignments, in particular, even rarely occurring assignments, having to be laboriously exactly trained. As a result, it is further possible to save computing time as well as corresponding computer capacities when training the machine learning algorithm, so that the method is able to be carried out, for example, also by a control unit designed in the at least one controllable system itself, which normally has less capacity than a comparable control unit designed in a backend. In addition, the machine learning algorithm or the initial model may be retrained during the operation of the at least one controllable system, in order to reduce uncertainties in the initial model, not all detected data being transferred to the corresponding control unit for retraining the machine learning algorithm, but only the data of selected channels.

In this way, it is possible to prevent problems during the data transfer, for example, latencies or interaction effects such as interferences. The data transfer may further be designed in such a way that conditions of a corresponding data transfer system, for example, capacities of a CAN bus or available bandwidths of a wireless data transfer are taken into consideration. In addition, the method ensures a dynamic refining or active learning of the algorithm, where very rare situations even in practice are able to be trained based on the selected transferred data. In this way the accuracy in assigning input values to output values when controlling the at least one controllable system may further be increased by the machine learning algorithm.

With one further specific embodiment of the present invention, a control unit is further provided for selecting training data for training a machine learning algorithm, the machine learning algorithm being an algorithm for controlling at least one controllable system, the machine learning algorithm assigning possible output values to input values, the machine learning algorithm including for each assignment of an input value to an output value an uncertainty, the uncertainty indicating in each case how well the assignment of the input value to the possible output value has previously been trained, and the machine learning algorithm having been pre-trained based on initially collected data, in order to obtain an initial model, and the control unit including a detection unit, which is designed to detect data characterizing an instantaneous state of at least one controllable system during an operation of the at least one controllable system, the detected data originating from a first number of channels, a first determination unit, which is designed to determine for each channel of the first number of channels in each case an influence, which the data originating from the corresponding channel have on the uncertainties instantaneously contained in the initial model, a second determination unit, which is designed to determine a set of channels from the first number of channels based on an established data level and on the respective influence, which the data originating from one of the channels from the first number of channels have on uncertainties instantaneously contained in the initial model, the data originating from channels contained in the set of channels being intended to be used for retraining the initial model, and a transfer unit, which is designed to transfer data originating from the individual channels of the set of channels to a control unit for training the machine learning algorithm.

Thus, on the whole, a control unit for transferring or for selecting training data for training a machine learning algorithm is specified, which is designed in such a way that not all detected data are transferred to the control unit for retraining the machine learning algorithm, but only the data of selected channels. In this way, it is possible to prevent problems during the data transfer, for example, latencies or interaction effects such as interferences. The data transfer may further be designed in such a way that conditions of a corresponding data transfer system, for example, capacities of a CAN bus or available bandwidths of a wireless data transfer are taken into consideration.

In one specific embodiment of the present invention, the initial model in this case is, in turn, a Gaussian process. Such a Gaussian process is suitable for obtaining or training the initial model in a quick and simple manner. The initial model may further, however, also be any other machine learning algorithm including uncertainties, for example, a Bayesian neural network.

The established data level in this case may indicate what percentage of all detected data is to be transferred to the control unit. For example, the established data level may indicate which capacities the corresponding data transfer means has or how large an available bandwidth is, so that the corresponding transfer may be regulated based on the conditions of the corresponding data transfer means itself.

The established data level may, however, further indicate how great the influence, which transferred data have on uncertainties instantaneously contained in the initial model on the whole should at least be. The established data level may, in particular, be established in such a way that uncertainties in the machine learning algorithm or in the initial model are preferably quickly reduced in a data-efficient manner, as a result of which, computing time and corresponding resources required during the refining or retraining of the initial model may be reduced.

The second determination unit in this case may be designed in each case to select the channels that are to be part of the set of channels in such a way that the number of channels that are part of the set of channels is minimized and at the same time the data originating from these channels have a maximum possible influence on the uncertainties instantaneously contained in the initial model. Thus, the second determination unit may be designed in each case to use a limited optimization method for determining the corresponding channels.

With one further specific embodiment of the present invention, a system for training a machine learning algorithm is also specified, the machine learning algorithm being an algorithm for controlling at least one controllable system, the machine learning algorithm assigning possible output values to input values, the machine learning algorithm including for each assignment of an input value to an output value an uncertainty, the uncertainty indicating in each case how well the assignment of the input value to the possible output value has previously been trained, and the system including a control unit described above for selecting training data for training the machine learning algorithm and a control unit for training the machine learning algorithm, the control unit for training the machine learning algorithm being designed to pre-train the machine learning algorithm based on initially collected data, in order to obtain an initial model, and to retrain the initial model based on data obtained by the control unit for selecting training data for training a machine learning algorithm for controlling a controllable system.

Thus, on the whole, an optimized system for training a machine learning algorithm and, in particular, an optimized system for retraining a machine learning algorithm including uncertainties is specified. The system in this case is designed in such a way that not all detected data are transferred to the control unit for training the machine learning algorithm for retraining the latter, but only the data of selected channels. In this way, it is possible to prevent problems during the data transfer, for example, latencies or interaction effects such as interferences. The data transfer may further be designed in such a way that conditions of a corresponding data transfer system, for example, capacities of a CAN bus or available bandwidths of a wireless data transfer are taken into consideration. In addition, the system ensures a dynamic refining or active learning of the algorithm, where very rare situations even in practice are able to be trained based on the selected transferred data. As a result, the accuracy in the assigning of input values to output values may further be increased by the machine learning algorithm.

With one further specific embodiment of the present invention, a system for controlling a controllable system is further also specified, the system including at least one controllable system and one control unit for controlling the at least one controllable system based on a machine learning algorithm trained by a system described above for training a machine learning algorithm.

Thus, on the whole, an optimized system for controlling at least one controllable system is specified, the at least one controllable system being controlled based on a machine learning algorithm, which has been trained based on an optimized method. Because an initial model is initially trained, the machine learning algorithm may thus be used already relatively quickly for controlling the at least one controllable system without initially all possible assignments, in particular, even rarely occurring assignments, having to be laboriously exactly trained. As a result, it is further possible to save computing time as well as corresponding computer capacities when training the machine learning algorithm. In addition, the machine learning algorithm or the initial model may be retrained during the operation of the at least one controllable system, in order to reduce uncertainties in the initial model, not all detected data being transferred to the corresponding control unit for retraining the machine learning algorithm, but only the data of selected channels.

In this way, it is possible to prevent problems during the data transfer, for example, latencies or interaction effects such as interferences. The data transfer may further be designed in such a way that conditions of a corresponding data transfer system, for example, capacities of a CAN bus or available bandwidths of a wireless data transfer, are taken into consideration. In addition, the method ensures a dynamic refining or active learning of the algorithm, where very rare situations even in practice are able to be trained based on the selected transferred data. In this way, the accuracy in assigning input values to output values when controlling the at least one controllable system may further be increased by the machine learning algorithm.

The at least one controllable system in this case may be an autonomously driving motor vehicle, i.e., a system in which a plurality of controllable functions or controllable actuators, for example, for speed setting, gear selection or temperature regulation may be controlled simultaneously and independently of one another during operation. Further, however, the at least one controllable system may, for example, also be any further controllable system based on a machine learning algorithm, for example, a kitchen appliance or a washing machine.

Thus, on the whole, it should be noted that an optimized method for training a machine learning algorithm and, in particular, an optimized method for retraining a machine learning algorithm including uncertainties, are specified with the present invention.

The embodiments and further refinements disclosed herein may be arbitrarily combined with one another.

Further possible embodiments, refinements and implementations of the present invention also include combinations not explicitly cited of features of the present invention described above or below with respect to the exemplary embodiments.

BRIEF DESCRIPTION OF THE DRAWINGS

The figures are intended to convey a further understanding of the specific embodiments of the present invention. They illustrate specific embodiments and serve to explain principles and concepts of the present invention in conjunction with the description.

Other specific embodiments and many of the cited advantages result with respect to the figures. The elements of the figures represented are not necessarily shown true to scale relative to one another.

FIG. 1 shows a flowchart of a method for training a machine learning algorithm according to specific example embodiments of the present invention.

FIG. 2 schematically shows a block diagram of a system for training a machine learning algorithm according to specific example embodiments of the present invention.

DETAILED DESCRIPTION OF EXAMPLE EMBODIMENTS

In the figures, identical reference numerals denote identical or functionally identical elements, parts or components unless otherwise indicated.

FIG. 1 shows a flowchart of a method 1 for training a machine learning algorithm according to specific embodiments of the present invention.

Digital control units are used in numerous applications for controlling and regulating technical systems, which are referred to below in general as controllable systems. The control units in this case process sensor signals or other input values according to a predefined control algorithm, so that one or multiple output values is/are ascertained for functions, for example, actuating variables for the activation of positioning elements.

The control algorithm may, for example, be a machine learning algorithm. In this case, individual controllable systems each collect data about their use, these data subsequently being used to train the machine learning algorithm accordingly. In general, such machine learning algorithms in this case are based on the fact that statistical methods are used in order to train a data processing system in such a way that the latter is able to carry out a particular task without it having been originally programed explicitly for this purpose. The aim of machine learning in this case is to construct algorithms, which are able to learn from data and to make predictions. These algorithms create mathematical models, with which, for example, data are able to be classified.

Methods are available in this case, in which the algorithm is first pre-trained on initially collected data in order to obtain an initial model, which includes uncertainties. This has the advantage that the machine learning algorithm in this case may already be relatively quickly used for controlling the at least one controllable system, without initially all possible assignments, in particular, even rarely occurring assignments, having to be laboriously exactly trained. As a result, it is further possible to save computing time as well as corresponding computer capacities when training the machine learning algorithm. During the operation of the at least one controllable system, the machine learning algorithm or the initial model may then be retrained based on corresponding data detected during the operation of the at least one controllable system in order to eliminate uncertainties.

In this connection, however, it is shown to be problematical, that controllable systems increasingly include a plurality of functions and/or corresponding actuators to be controlled. If during the operation of the controllable system, data relating to all of these functions to be controlled were now detected and thus a plurality of data or a large volume of data were to be transferred to a corresponding control unit for retraining the machine learning algorithm, this may, however, result in problems during the data transfer, for example, in latencies or interaction effects such as interferences.

According to the specific embodiments of FIG. 1, a method 1 for training a machine learning algorithm is specified, the machine learning algorithm being an algorithm for controlling at least one controllable system, the machine learning algorithm assigning possible output values to input values, the machine learning algorithm including for each assignment of an input value to an output value an uncertainty, and the uncertainty indicating in each case how well the assignment of the input value to the possible output value has previously been trained. Method 1 in this case includes a step 2 of a pre-training of the machine learning algorithm based on data initially collected by a control unit for training the machine learning algorithm, in order to obtain an initial model. Further, in a subsequent step 3, data characterizing an instantaneous state of the at least one controllable system are detected during an operation of the at least one controllable system, the detected data originating from a first number of channels, for each channel of the first number of channels, in each case an influence, which the data originating from the corresponding channel have on uncertainties instantaneously contained in the initial model is determined in a step 4, and a set of channels from the first number of channels is determined in a step 5, the data originating from channels contained in the set of channels being intended to be used for retraining the initial model, based on an established data level and on the respective influence, which the data originating from one of the channels from the first number of channels have on the uncertainties instantaneously contained in the initial model, in a subsequent step 6 the detected data originating from the individual channels of the set of channels being transferred to the control unit and the initial model subsequently being retrained by the control unit in a step 7 based on the data transferred to the control unit.

Uncertainty is understood hereby to mean a value or a variable, which indicates the quality of the assignment between the input value and the corresponding output value, i.e., on how much information content this assignment is based or how many training data have previously been received close to the assignment.

Initially collected data are further understood to mean data or training data, which are initially available for training the machine learning algorithm, these being, in particular, data that describe frequent or regularly occurring situations. The machine learning algorithm trained on these initially collected data is referred to in this case as an initial model.

Channels are understood to mean further elements, for example, sensors, which detect data during the operation of the at least one controllable system, which characterize the corresponding output values or settings of individual controllable functions or controllable actuators of the at least one controllable system, the individual controllable systems or controllable actuators being capable of being controlled or set during the operation of the at least one controllable system, in particular, also independently of the other controllable functions or controllable actuators of the at least one controllable system. For example, an autonomously driving vehicle may include functions for controlling a speed, a gear selection, and a temperature regulation based on an instantaneous situation, the data characterizing the settings of the speed and/or the gear selection and/or a temperature regulation correspondingly made during an operation of the autonomously driving motor vehicle being detected.

Influence, which the data originating from one of the channels from the first number of channels have on the uncertainties instantaneously contained in the initial model, is further understood to mean an information content of the data originating from the corresponding channel, the information content indicating to what extent these data are relevant for the retraining of the initial model, i.e., whether or to what extent uncertainties in the initial model may be reduced by a retraining of the initial model based on these data. Instantaneously contained uncertainties in this case refer to uncertainties contained in the potentially already retrained initial model at a particular point in time.

Furthermore, the established data level refers to a defined level of pieces of information in the data transferred to the control unit, for example, a volume of data to be maximally transferred or how high the information content in the transferred data overall should at least be. The established data level in this case may be predefined, for example, by a model manufacturer or by a manufacturer of the at least one controllable system or by an operator of the control unit or of a corresponding data center.

Thus, on the whole, not all detected data are transferred to the control unit for retraining the machine learning algorithm, but only the data of selected channels. In this way, it is possible to prevent problems during the data transfer, for example, latencies or interaction effects such as interferences. The data transfer may further be designed in such a way that conditions of a corresponding data transfer system, for example, capacities of a CAN bus or available bandwidths of a wireless data transfer are taken into consideration. In addition, the method ensures a dynamic refining or active learning of the algorithm where, based on the selected transferred data, very rare situations even in practice may be trained. As a result, the accuracy in the assigning of input values to output values may further be increased by the machine learning algorithm. Thus, on the whole, an optimized method 1 for training a machine learning algorithm and, in particular, an optimized method 1 for retraining a machine learning algorithm including uncertainties are specified.

Method 1 in this case may be carried out repeatedly, for example, at particular time intervals, for example, every 10 minutes. The time intervals may further, however, also be adaptively adapted between individual repetitions of method 1. In this case a prediction model, in turn, may be used, which indicates which data are expected at certain points in time, where based on this prediction model and, if necessary, its uncertainties, it may be decided at which point in time or after which period of time method 1 is carried out again.

Furthermore, the number of selected channels, whose data are transferred, may also be zero, which is equivalent to saying that in the corresponding step no data are transferred to the control unit for training the machine learning algorithm.

Thus, on the whole, an information-optional selection of whether and if so, which channels of the data are to be transferred, may be implemented based on method 1.

According to the specific embodiments of FIG. 1, the initial model in this case is a Gaussian process. A Gaussian process in this case refers to a multivariate normal distribution with correlations over a function. Gaussian processes are useful as methods in machine learning, since a Gaussian process including a covariance function, which controls its characteristic, may also be understood to mean a prior assumption about the properties of an unknown function. This prior assumption may be efficiently conditioned based on data, as a result of which a posteriori distribution is formed, which may be utilized for predicting unknown data points. Gaussian processes thus offer a complete Bayesian framework for inferring functions.

The uncertainty indication or quality indication, which is frequently also referred to as tolerance, may be determined in this case as the variance, in particular, predictive variance of the Gaussian process.

In addition, the established data level indicates what percentage of all detected data is to be transferred to the control unit. The established data level may, however, further also indicate how great the influence, which the transferred data have on uncertainties instantaneously contained in the initial model, should at least be or also what percentage of the pieces of information transferred on average previously or during previous embodiments of the method should be contained in the transferred data.

The channels of the set of channels may be selected in this case based on a limited optimization problem. According to the specific embodiments of FIG. 1, step 5 includes the determination of a set of channels from the first number of channels, the data originating from the channels contained in the set of channels being intended to be used for retraining the initial model, including in each case a selection of channels that are to be part of the set of channels in such a way that the number of channels that are part of the set of channels is minimized and, at the same time, the data originating from these channels have a maximum possible influence on the uncertainties instantaneously contained in the initial model.

According to the specific embodiments of FIG. 1, the determination of the elements of the set of channels further takes place in such a way that the determination is discontinued once the number of the channels is less than a first predefined threshold value or the number of the data to be transferred is less than a second threshold value defined, in particular, by the data level, as a result of which computing time may further accordingly be saved.

FIG. 2 schematically shows a block diagram of a system 10 for training a machine learning algorithm according to specific embodiments of the present invention.

The machine learning algorithm in this case is, in turn, an algorithm for controlling at least one controllable system, the machine learning algorithm assigning possible output values to input values, the machine learning algorithm including for each assignment of an input value to an output value an uncertainty, the uncertainty indicating in each case how well the assignment of the input value to the possible output value has previously been trained.

As shown in FIG. 2, system 10 in this case includes a control unit for selecting training data for training machine learning algorithm 11 and a control unit for training machine learning algorithm 12, the control unit for training machine learning algorithm 12 being designed to pre-train the machine learning algorithm based on initially collected data in order to obtain an initial model, and to retrain the initial model based on data obtained from the control unit for selecting training data for training a machine learning algorithm 11 for controlling a controllable system.

In this case, the control unit for selecting training data for training machine learning algorithm 11 may, in particular, be designed in the at least one controllable system itself or be integrated into the latter.

The control unit for training machine learning algorithm 12 may further also be designed in the at least one controllable system itself or else also be designed in a backend, if control unit 12 is designed in the backend, a prediction model about what is to be expected in the near future in terms of data being used, the prediction model, in turn, being capable of being a machine learning algorithm taught during the operation of the at least one controllable system, and a separate prediction model being capable of being trained for each channel. Control unit 12 in this case may predict based on the prediction model, which data are able to be obtained in the near future and accordingly communicate to control unit 11, on the basis of which of these data expected in the near future, uncertainties instantaneously contained in the initial model may be reduced.

According to the specific embodiments of FIG. 2, the at least one controllable system in this case is further an autonomously driving motor vehicle, or functions relating to the operation of an autonomously driving motor vehicle, in particular, speed setting, gear selection, or temperature regulation.

As further shown in FIG. 2, the control unit for selecting training data for training a machine learning algorithm 11 in this case includes a detection unit 13, which is designed to detect data characterizing an instantaneous state of the at least one controllable system during an operation of the at least one controllable system, the detected data originating from a first number of channels, a first determination unit 14, which is designed to determine for each channel of the first number of channels in each case an influence, which the data originating from the corresponding channel have on uncertainties instantaneously contained in the initial model, a second determination unit 15, which is designed to determine a set of channels from the first number of channels based on an established data level and on the respective influence, which the data originating from one of the channels of the first number of channels have on uncertainties instantaneously contained in the initial model, the data originating from channels contained in the set of channels being intended to be used for retraining the initial model, and a transfer unit 16, which is designed to transfer data originating from the individual channels of the set of channels to a control unit for training the machine learning algorithm 12.

The detection unit and the transfer unit in this case may, for example, both be integrated into a transceiver. The first determination unit and the second determination unit may further both be implemented, in each case, for example, based on code stored in a memory and executable by a processor.

In addition, the control unit for training machine learning algorithm 12 also includes a detection unit 17, which is designed to detect or to receive the data transferred by transfer unit 16.

The individual data in this case may, for example, be detected by corresponding sensors or corresponding control units designed in the at least one controllable system or in the autonomously driving motor vehicle, the channels, according to the specific embodiments of FIG. 2, being corresponding pieces of information about an instantaneously set speed, an instantaneously selected gear, or an instantaneously affected temperature regulation.

According to the specific embodiments of FIG. 2, the initial model is, in turn, a Gaussian process.

In addition, the established data level, in turn, indicates what percentage of all detected data is to be transferred to the control unit.

According to the specific embodiments of FIG. 2, second determination unit 15 is further designed to select the channels that are to be part of the set of channels in such a way that the number of the channels that are part of the set of channels, is minimized and, at the same time, the data originating from these channels has a maximum possible influence on the uncertainties instantaneously contained in the initial model. Thus, second determination unit 15 is, in turn, designed to ascertain the set of channels based on a limited optimization problem.

What is claimed is:

1. A method for training a machine learning algorithm, the machine learning algorithm being an algorithm for controlling at least one controllable system, the machine learning algorithm to assign possible output values to input values, the machine learning algorithm including, for each assignment of an input value to an output value, an uncertainty, the uncertainty indicating in each case how well the assignment of the input value to the possible output value has previously been trained, the method comprising the following steps:
    pre-training the machine learning algorithm based on data initially collected by a control unit for training the machine learning algorithm in order to obtain an initial model;
    detecting data characterizing an instantaneous state of the at least one controllable system during an operation of the at least one controllable system, the detected data originating from a first number of channels;
    determining, for each channel of the first number of channels, a respective influence, which the data originating from the channel have on uncertainties instantaneously contained in the initial model;
    determining a set of channels from the first number of channels, the data originating from channels contained in the set of channels being intended to be used for retraining the initial model, the determining of the set of channels being based on an established data level and on the respective influences which the data originating from the channels of the first number of channels have on uncertainties instantaneously contained in the initial model;
    transferring data originating from individual channels of the set of channels to the control unit; and
    retraining of the initial model by the control unit based on the data transferred to the control unit;
    controlling the at least one controllable system based on the trained machine learning algorithm.

2. The method as recited in claim 1, wherein the initial model is a Gaussian process.

3. The method as recited in claim 1, wherein the established data level indicates what percentage of all detected data is to be transferred to the control unit.

4. The method as recited in claim 1, wherein the established data level indicates how great an influence, which the transferred data have on uncertainties instantaneously contained in the initial model.

5. The method as recited in claim 3, wherein the step of determining the set of channels from the first number of channels, the data originating from the channels contained in the set of channels being intended to retrain the initial model, further includes the step:
    selecting channels from the first number of channels that are to be part of the set of channels in such a way that a number of channels that are part of the set of channels is minimized and, at the same time, the data originating from the selected channels have a maximum possible influence on the uncertainties instantaneously contained in the initial model.

6. A method for controlling at least one controllable system, the method comprising the following steps:
    training of a machine learning algorithm for controlling the at least one controllable system by:
        pre-training the machine learning algorithm based on data initially collected by a control unit for training the machine learning algorithm in order to obtain an initial model,
        detecting data characterizing an instantaneous state of the at least one controllable system during an operation of the at least one controllable system, the detected data originating from a first number of channels,
        determining, for each channel of the first number of channels, a respective influence, which the data originating from the channel have on uncertainties instantaneously contained in the initial model,
        determining a set of channels from the first number of channels, the data originating from channels contained in the set of channels being intended to be used for retraining the initial model, the determining of the set of channels being based on an established data level and on the respective influences which the data originating from the channels of the first number of channels have on uncertainties instantaneously contained in the initial model,
        transferring data originating from individual channels of the set of channels to the control unit, and
        retraining of the initial model by the control unit based on the data transferred to the control unit; and
    controlling the at least one controllable system based on the trained machine learning algorithm.

7. A control unit for selecting training data for training a machine learning algorithm, the machine learning algorithm being an algorithm for controlling at least one controllable system, the machine learning algorithm to assign possible output values to input values, the machine learning algorithm including for each assignment of an input value to an output value an uncertainty, the uncertainty indicating in each case how well the assignment of the input value to the output value has previously been trained, and the machine learning algorithm having been pre-trained based on initially collected data in order to obtain an initial model, the control unit for selecting the training data comprising:
  a detection unit to detect data characterizing an instantaneous state of at least one controllable system during an operation of the at least one controllable system, the detected data originating from a first number of channels;
  a first determination unit to determine for each channel of the first number of channels, a respective influence, which the data originating from the channel have on uncertainties instantaneously contained in the initial model;
  a second determination unit to determine a set of channels from the first number of channels, based on an established data level and on the respective influences which the data originating from the channels of the first number of channels have on uncertainties instantaneously contained in the initial model, the data originating from the channels contained in the set of channels being intended to be used to retrain the initial model; and
  a transfer unit to transfer data originating from individual channels of the set of channels to a control unit for training the machine learning algorithm;
  wherein the control unit controls the at least one controllable system based on the trained machine learning algorithm.

8. The control unit as recited in claim 7, wherein the initial model is a Gaussian process.

9. The control unit as recited in claim 7, wherein the established data level indicates what percentage of all detected data is to be transferred to the control unit for training the machine learning algorithm.

10. The control unit as recited in claim 7, wherein the established data level indicates how great an influence, which the transferred data have on uncertainties instantaneously contained in the initial model.

11. The control unit as recited in claim 9, wherein the second determination unit selects the channels that are to be part of the set of channels in such a way that a number of channels that are part of the set of channels is minimized and, at the same time, the data originating from the selected channels have a maximum possible influence on uncertainties instantaneously contained in the initial model.

12. A system for training a machine learning algorithm, the machine learning algorithm being an algorithm for controlling at least one controllable system, the machine learning algorithm to assign possible output values to input values, the machine learning algorithm including for each assignment of an input value to an output value an uncertainty, the uncertainty indicating in each case how well the assignment of the input value to the possible output value has been previously trained, and the system comprising:
  a control unit to select training data for training the machine learning algorithm including:
    a detection unit to detect data characterizing an instantaneous state of at least one controllable system during an operation of the at least one controllable system, the detected data originating from a first number of channels,
    a first determination unit to determine for each channel of the first number of channels, a respective influence, which the data originating from the channel have on uncertainties instantaneously contained in the initial model,
    a second determination unit to determine a set of channels from the first number of channels, based on an established data level and on the respective influences which the data originating from the channels of the first number of channels have on uncertainties instantaneously contained in the initial model, the data originating from the channels contained in the set of channels being intended to be used to retrain the initial model, and
    a transfer unit to transfer data originating from individual channels of the set of channels to a control unit for training the machine learning algorithm;
  the control unit for training the machine learning algorithm, the control unit for training the machine learning algorithm to pre-train the machine learning algorithm based on initially collected data in order to obtain an initial model, and to retrain the initial model based on data transferred to it by the control unit for selecting training data for training the machine learning algorithm; and
  a control unit to control the at least one controllable system based on the trained machine learning algorithm.

13. A system for controlling a controllable system, the system comprising:
  at least one controllable system; and
  a control unit to control the at least one controllable system based on a machine learning algorithm trained by a system to train a machine learning algorithm the machine learning algorithm being an algorithm for controlling the at least one controllable system, the machine learning algorithm to assign possible output values to input values, the machine learning algorithm including for each assignment of an input value to an output value an uncertainty, the uncertainty indicating in each case how well the assignment of the input value to the possible output value has been previously trained, and the system to train the machine learning algorithm including:
    a control unit to select training data for training the machine learning algorithm including:
      a detection unit to detect data characterizing an instantaneous state of the at least one controllable system during an operation of the at least one controllable system, the detected data originating from a first number of channels,
      a first determination unit to determine for each channel of the first number of channels, a respective influence, which the data originating from the channel have on uncertainties instantaneously contained in the initial model,
      a second determination unit to determine a set of channels from the first number of channels, based on an established data level and on the respective influences which the data originating from the channels of the first number of channels have on uncertainties instantaneously contained in the initial model, the data originating from the channels contained in the set of channels being intended to be used to retrain the initial model, and
      a transfer unit to transfer data originating from individual channels of the set of channels to a control unit to train the machine learning algorithm, and
    the control unit to train the machine learning algorithm, the control unit for training the machine learning algorithm to pre-train the machine learning algorithm based on initially collected data in order to obtain an initial model, and to retrain the initial model based on data transferred to it by the control unit for selecting training data for training the machine learning algorithm.

14. The system as recited in claim 13, wherein the at least one controllable system is an autonomously driving motor vehicle.

\* \* \* \* \*